(12) United States Patent
Haimer

(10) Patent No.: US 9,987,692 B2
(45) Date of Patent: Jun. 5, 2018

(54) CENTERING DEVICE

(71) Applicant: FRANZ HAIMER MASCHINENBAU KG, Hollenbach-Igenhausen (DE)

(72) Inventor: Franz Haimer, Igenhausen (DE)

(73) Assignee: FRANZ HAIMER MASCHINENBAU KG, Hollenbach-Igenhausen (DE)

( * ) Notice: Subject to any disclaimer, the term of this patent is extended or adjusted under 35 U.S.C. 154(b) by 5 days.

(21) Appl. No.: 14/420,396

(22) PCT Filed: Aug. 7, 2013

(86) PCT No.: PCT/EP2013/066573
§ 371 (c)(1),
(2) Date: Feb. 9, 2015

(87) PCT Pub. No.: WO2014/023778
PCT Pub. Date: Feb. 13, 2014

(65) Prior Publication Data
US 2015/0217385 A1 Aug. 6, 2015

(30) Foreign Application Priority Data

Aug. 9, 2012 (DE) .................. 10 2012 107 331
May 22, 2013 (DE) .................. 10 2013 105 206

(51) Int. Cl.
*B23B 31/10* (2006.01)
*B23C 5/26* (2006.01)
*F16D 1/08* (2006.01)

(52) U.S. Cl.
CPC .............. *B23C 5/26* (2013.01); *F16D 1/0835* (2013.01); *B23C 2250/04* (2013.01);
(Continued)

(58) Field of Classification Search
CPC ... B23C 5/26; B23C 2250/04; B23C 2265/32; B23C 2270/12; F16D 1/0835; Y10T 279/29; Y10T 279/34
See application file for complete search history.

(56) References Cited

U.S. PATENT DOCUMENTS

| 1,797,296 A | 3/1931 | Ray |
| 2,008,185 A | 7/1935 | Pittoni |

(Continued)

FOREIGN PATENT DOCUMENTS

| DE | 1010335 B | * 6/1957 | ............. F16C 27/04 |
| DE | 50166 | 10/1966 | |

(Continued)

OTHER PUBLICATIONS

Written Opinion for PCT/EP2013/066573 filed on Aug. 7, 2013.

(Continued)

*Primary Examiner* — Daniel Howell
*Assistant Examiner* — Paul M Janeski
(74) *Attorney, Agent, or Firm* — Paul D. Bianco; Gary S. Winer; Fleit Gibbons Gutman Bongini & Bianco PL

(57) ABSTRACT

A centering device for centrally chucking a rotary tool includes a socket on a mandrel of a tool holder. A tool arrangement includes a tool holder that has a mandrel, and including a rotary tool that is placed on the tool holder and includes a socket. In order to create a universal centering device that is easy to manufacture and can be used for a multitude of internal chucking units, and create a tool arrangement in which the rotary tool can be centered with high accuracy on the internal chucking unit, the centering device is designed as a closed centering ring which can be inserted between the rotary tool and the mandrel and which (Continued)

has an elastically deformable contour, and such a centering device is disposed between the mandrel and the rotary tool in the tool arrangement.

4 Claims, 4 Drawing Sheets

(52) U.S. Cl.
CPC ...... *B23C 2265/32* (2013.01); *B23C 2270/06* (2013.01); *B23C 2270/12* (2013.01); *Y10T 279/26* (2015.01); *Y10T 279/34* (2015.01)

(56) References Cited

U.S. PATENT DOCUMENTS

| | | |
|---|---|---|
| 2,612,376 A | 9/1952 | Wollner |
| 3,036,838 A | 5/1962 | Barber |
| 3,112,116 A | 11/1963 | Seitz |
| 3,986,302 A | 10/1976 | Biardi |
| 4,701,084 A | 10/1987 | Ide |
| 6,126,130 A | 10/2000 | Planck |
| 8,651,498 B2 | 2/2014 | Timtner et al. |
| 8,931,983 B2 | 1/2015 | Sharivker et al. |
| 2002/0081164 A1 | 6/2002 | Pokolm |
| 2008/0185792 A1 | 8/2008 | Hopfner et al. |
| 2010/0109261 A1 | 5/2010 | Timtner et al. |
| 2010/0209183 A1 | 8/2010 | Fugel et al. |
| 2012/0009027 A1 | 1/2012 | Sharivker et al. |

FOREIGN PATENT DOCUMENTS

| | | |
|---|---|---|
| DE | 2555613 | 6/1976 |
| DE | 4004150 | 9/1990 |
| DE | 4019506 | 1/1992 |
| DE | 19753781 | 6/1999 |
| DE | 19961451 | 6/2001 |
| DE | 20203035 | 5/2002 |
| DE | 102004055377 | 5/2006 |
| DE | 102007032655 | 1/2009 |
| DE | 102008054140 | 5/2010 |
| EP | 0208786 | 1/1987 |
| EP | 0426097 | 5/1991 |
| FR | 2297107 | 8/1976 |
| GB | 1477115 | 6/1977 |
| WO | 9411143 | 5/1994 |
| WO | 2005063426 | 7/2005 |
| WO | 2009140109 | 11/2009 |

OTHER PUBLICATIONS

International Preliminary Report on Patentability dated Feb. 10, 2015 for PCT/EP2013/066573 filed on Aug. 7, 2013.
Machine Translation of DE20203035.
Machine Translation of FR2297107 created Mar. 24, 2015.
International Search Report for PCT/EP2013/066573 dated Dec. 20, 2013.
Result of search report for DE 10 2012 107 331.7 filed Aug. 9, 2012.
Result of search report for DE 10 2013 105 206.1 filed May 22, 2013.

* cited by examiner

CENTERING DEVICE

FIELD OF THE INVENTION

The invention concerns a centering device and a tool arrangement with such a centering device.

BACKGROUND OF THE INVENTION

In mechanical engineering, processing machines that chuck a rotary tool by means of an internal chucking unit are often used. The rotary tool hereby has a cylindrical socket, which corresponds to a mandrel on a tool holder of the processing machine. For the connection, the rotary tool is attached on the mandrel and is mostly secured from the front side of the tool holder by means of a screw connection. In order to be able to attach the socket on the mandrel, tolerances in the fit are required. However, as a result of these fits, a centric chucking of the rotary tool on the mandrel with a high accuracy is not possible, which leads to manufacturing errors or an increased wear on the rotary tool.

From the state of the art, various solutions for this problem are known. Thus, WO 2005/063426 A1 shows an internal chucking unit with a mandrel for the centering of a rotary tool with a socket. The mandrel has a segment chucking device with several rigid chucking segments that protrude radially outward. The chucking segments are supported on a conical surface such that a movement of the chucking segments in the longitudinal direction of the mandrel brings about a radial movement of the chucking segments in the direction of the rotary tool. Thus, the chucking segments can be employed on the socket, wherein the tolerance in the fit between the mandrel and the socket of the rotary tool is overcome and a good centric chucking is attained. In order to hold the chucking segments together and to support a loosening of the segment chucking device, the chucking segments are elastically connected by means of rubber elements.

From FR 2 297 107 A1, an internal chucking device for a rotary tool is also known. As also shown already in WO 2005/063426 A1, the internal chucking device is designed as a segment chucking device with several chucking segments, protruding radially outward, for the centering of the rotary tool. In contrast to the subject of WO 2005/063426 A1, a surrounding rubber ring is provided for the securing of the chucking segments.

SUMMARY OF THE INVENTION

Some embodiments of the invention relate to a universal, easy to manufacture centering device that can be used for a multitude of internal chucking devices, and a tool arrangement with a high-precision centering of the rotary tool on the internal chucking device. Other embodiments are also disclosed.

The centering device in accordance with the invention is designed as a closed centering ring that can be inserted between a rotary tool and a mandrel, and has an elastically deformable contour. In this way, on the one hand, a simple structure and thus a favorable manufacturing, and, on other hand, a high-precision centering are made possible. With a fastening of the rotary tool on the mandrel of the tool holder, the centering ring is arranged between them and is clamped as the result of an elastic deformation. By the design of the centering device as a closed ring, it is guaranteed that the chucking from the elastic deformation is uniformly distributed and thus, the precise centering is attained.

In an appropriate embodiment, the centering has elastically deformable external or internal centering areas that protrude outward and/or inward. The external centering areas and the internal centering areas are appropriately located on the centering ring, staggered in the circumferential direction. By means of these additional elastic external or internal centering areas, the accuracy of the centering of the clamping of the rotary tool on the mandrel can be further increased.

In a particularly preferred embodiment, the centering device is designed with a round or a polygonal in its cross section. Appropriately, the polygonal cross section has three rounded corners and a wall thickness that is constant for the most part. Such an embodiment can be manufactured in a particularly simple manner, for example, by shaping a cylindrical ring, and a defined and centering placement is attained through the three centering areas. Alternatively, however, the designing of the centering device with a polygonal cross section with more than three corners is possible.

In an alternative embodiment, the centering ring can also be designed cylindrical, with a ring-shaped bead that goes around in the circumferential direction and is radially curved outward or inward. The surrounding ring-shaped bead is elastic in the radial direction and forms the external centering area. What is also advantageous about such an embodiment of the centering ring is that it has a sealing effect in the longitudinal direction and thus can be used to seal against a cooling agent or a lubricant.

In another alternative embodiment, the centering ring has a concave or convex wall in its cross section. The centering ring can also appropriately contain longitudinal slits that are distributed in the circumferential direction, which make possible an adaptation of the elasticity of the centering ring.

Moreover, a tool arrangement comprising a tool holder with a mandrel and a rotary tool placed on the tool holder with a holder socket is claimed, wherein a centering device of the described type is disposed between the mandrel and the rotary device for the accurate centering of the rotary tool relative to the mandrel.

BRIEF DESCRIPTION OF THE DRAWINGS

Other features and advantages of the invention can be deduced from the following description of preferred embodiment examples, with the aid of the drawing. The figures show the following.

DETAILED DESCRIPTION OF THE INVENTION

Figure 1:
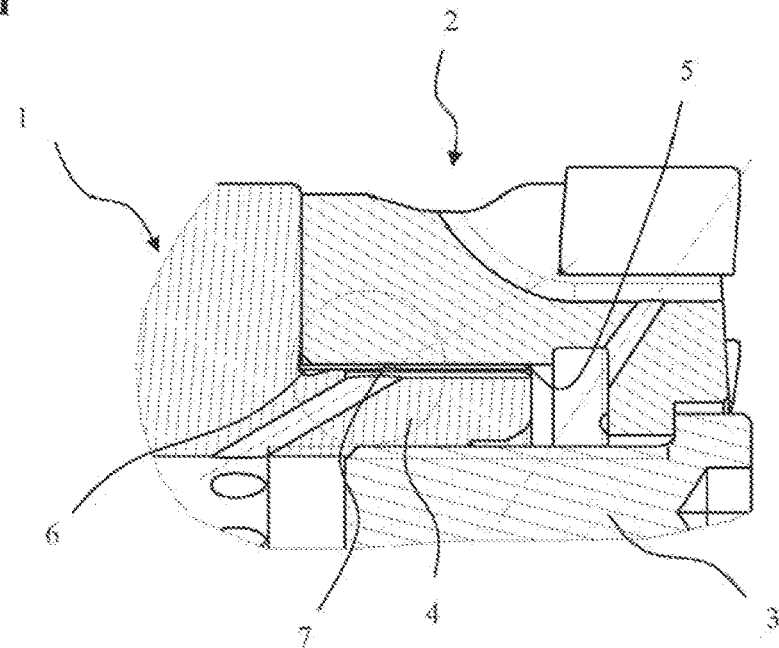
FIG. 1, a longitudinal section through the front part of a tool arrangement with a tool holder, a rotary tool, and a centering device in accordance with the invention.

FIG. 1 shows the front part of a tool arrangement in accordance with the invention with a tool holder 1, on which a rotary tool 2, designed as a milling cutter here, is fastened by means of a locking screw 3. The tool holder 1 has a cylindrical mandrel 4, on which the rotary tool 2 is attached with a holder socket 5 that corresponds to it. In order to be able to slide the rotary tool 2 over the entire length of the mandrel 4, the mandrel 4 must have a corresponding tolerance relative to the holder socket 5, which is, however, disadvantageous for the centering of the rotary tool 2 on the tool holder 1. So as to avoid this, a centering device is provided, which is designed as a centering ring 6 and is disposed between the mandrel 4 and the holder socket 5 of the rotary tool 2.

Figure 2:
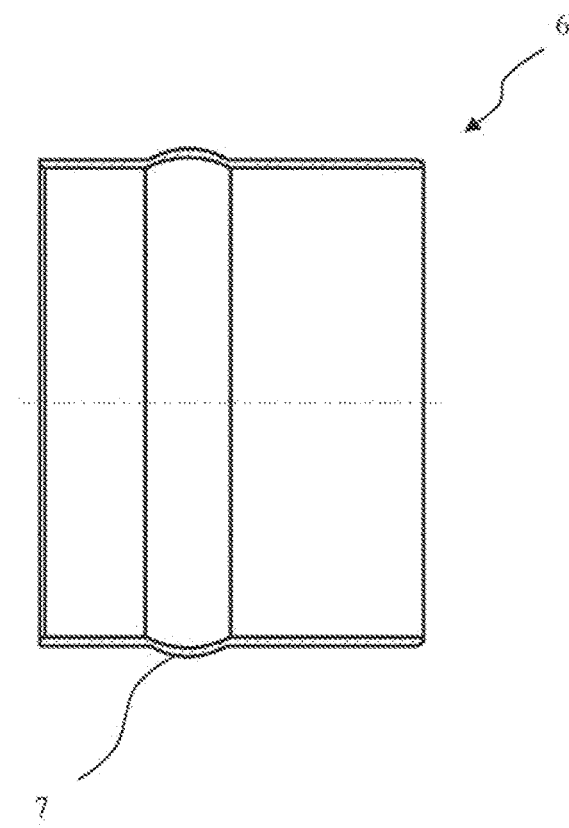
FIG. 2, a longitudinal section through the centering device from FIG. 1.

FIG. 2 shows the centering ring 6 of FIG. 1 separately. This consists of a cylindrical tube, which has a curved, ring-shaped bead 7 that protrudes outward and is made of an elastic material, such as a metal or a plastic. Under pressure on the ring-shaped bead from the outside, it moves elastically and radially inward.

When the rotary tool 2 is installed on the tool holder 1, the centering ring 6 is appropriately first placed on the mandrel 4 of the tool holder 1 and then the rotary holder 2 is placed on the centering ring 6. However, it is also possible to first connect the centering ring 6 with the rotary tool 2. The ring-shaped bead 7 has a slight dimensional excess relative to the holder socket 5 of the rotary tool 2, so that when the rotary tool 2 is slid, the ring-shaped bead 7 is slightly and elastically deformed or moved radially inward and thus the rotary tool 2 is clamped centrically against the mandrel 4. In this way, a precise centering of the rotary tool 2 on the tool holder 1 is made possible.

Figure 3:
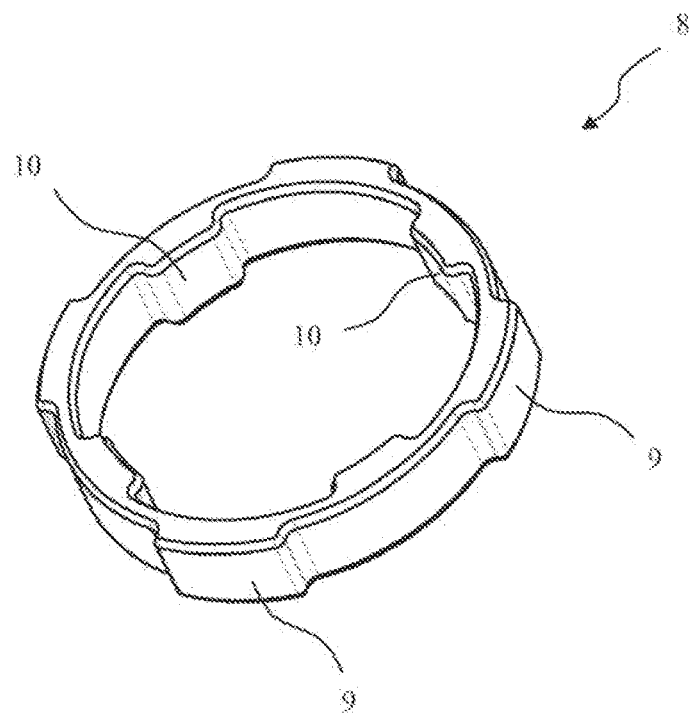
FIG. 3, a perspective view of another embodiment of the centering device in accordance with the invention.

FIG. 3 shows an alternative embodiment of the centering ring 6 from FIG. 2. As in the embodiment of FIGS. 1 and 2, the centering ring 8 shown in FIG. 3 is essentially designed in a cylindrical manner. In contrast to the embodiment example of FIGS. 1 and 2, the centering ring 8 has external centering areas 9 that protrude radially outward and internal centering areas 10 that protrude radially inward, which are located, uniformly staggered with respect to one another, in the circumferential direction of the centering ring 8.

In a manner alternative to the centering ring 6, the centering ring 8 can be arranged between the mandrel 4, shown in FIG. 1, and the rotary tool 2, wherein the external centering areas 9 lie on the holder socket 5 of the rotary tool 2 and the internal centering areas 10, on the mandrel 4. The centering ring 8 is dimensioned in such a manner that the external centering areas 9 have a slight dimensional excess relative to the holder socket 5 of the rotary tool 2, and/or the internal centering areas 10, a slightly reduced dimension relative to the outer diameter of the mandrel 4. When installed, the centering areas 9 and 10 are consequently elastically deformed, in the radial direction, wherein the rotary tool 2 is clamped and centered relative to the mandrel 4.

Figure 4:
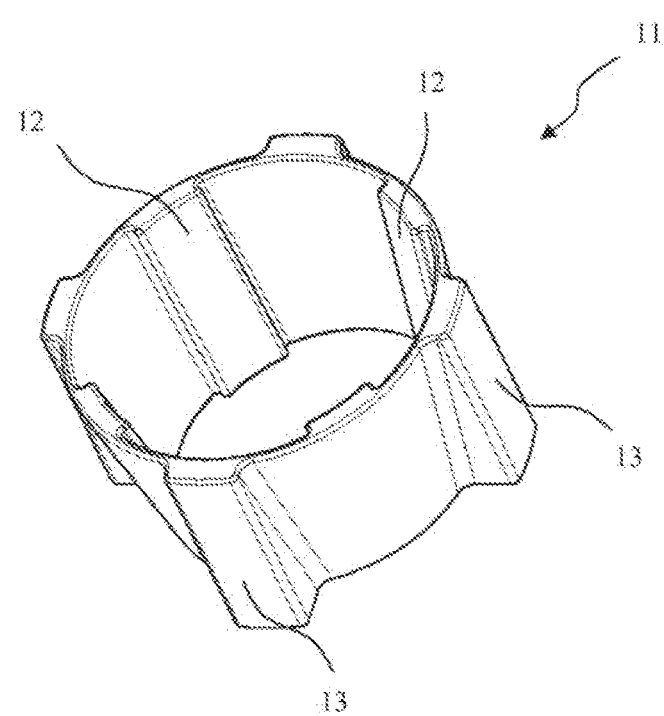
FIG. 4, an alternative embodiment of the centering device from FIG. 3.

FIG. 4 shows an alternative embodiment of the centering ring 8 from FIG. 3. Just as in the embodiment example of FIG. 3, internal centering areas 12 that protrude radially inward and external centering areas 13 that protrude radially outward are disposed, staggered with respect to one another, in the circumferential direction on the centering ring 11 shown in FIG. 4. In contrast to the centering ring 8 in FIG. 3, the centering ring 11 and the internal centering areas 12 are designed conically. By means of these conical internal centering areas 12, an additional centering of the centering ring 11 on the mandrel 4 is attained. However, it is also possible for the external centering areas 13 and/or both centering areas 12 and 13 to be made conically, so as to further increase the centering effect.

Figure 5:
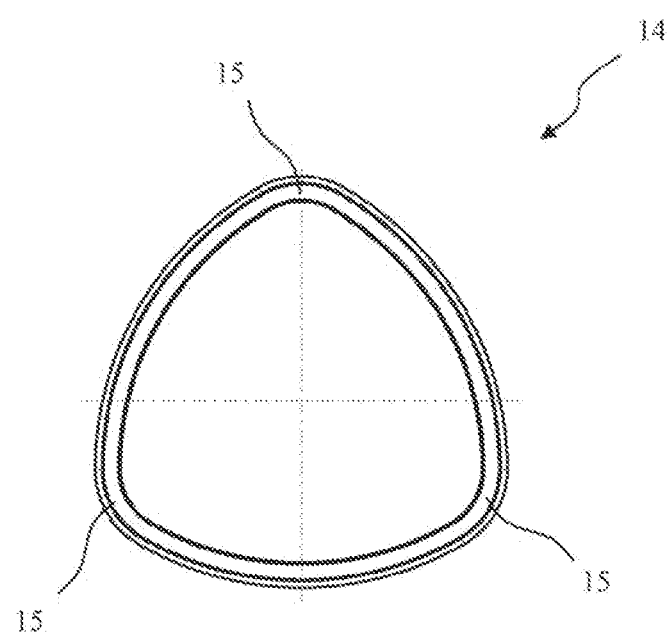
FIG. 5, a front view of another embodiment of the centering device in accordance with the invention.

In another embodiment of the centering device, FIG. 5 shows a centering ring 14 in accordance with the invention in a front view. The centering ring 14 is designed in cross section as a polygon with three rounded corners 15 uniformly distributed in the circumferential direction, and is preferably made of an elastic plastic or metal. The centering ring 14 can be made, for example, by a plastic deformation of a cylindrical workpiece blank, in a simple and low cost manner.

The centering ring 14 is dimensioned in such a manner that the largest outer diameter of the external centering areas, which protrude outward and are designed as corners 15, has a slight excess dimension in comparison to the holder socket 5 of the rotary tool 2 to be centered, shown in FIG. 1. The smallest inner diameters of the centering ring 14, which are disposed between two corners 15 and which form the internal centering areas, are, moreover, slightly smaller than the outer diameter of the mandrel 4 from FIG. 1. If the centering ring 14, instead of the centering ring 6, is disposed between the rotary tool 2 and the mandrel 4 in FIG. 1, the corners 15 are deformed radially and elastically inward as a result of the squeezing by the holder socket 5, and the internal centering areas with the smallest internal diameters of the centering ring 14, outward. By means of this elastic deformation of the centering ring 14, the rotary tool 2 is clamped and centered relative to the mandrel 4.

Figure 6:
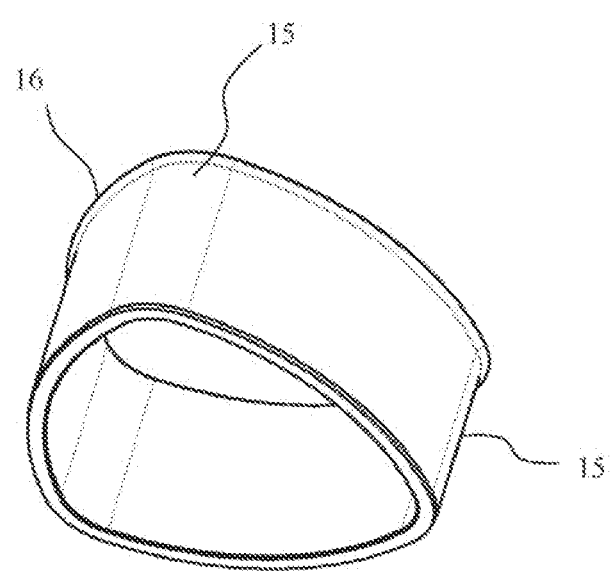
FIG. 6, a perspective view of the centering device from FIG. 5.

As can be deduced from the perspective view of the centering ring 14 in FIG. 6, the centering ring 14 has a surrounding collar 16 that stands out radially outward on one end. The collar 16 is used for the precise positional placement of the centering ring 14 on the rotary tool 2, so that the installation of the centering ring 14 on the rotary tool 2 can take place in a simple and precise manner. As a result of the clamping due to the squeezing of the centering ring 14 in the rotary tool 2, it is, moreover, securely held by friction contact in the rotary tool 2, wherein the subsequent installation is simplified. On the rotary tool 2 in FIG. 1, it is possible, moreover, to place a bevel on the holder socket 5; it corresponds to the surrounding collar 16 and holds it in its entirety, so that the installation of the rotary tool 2 with the centering ring 14 on the mandrel 4 of the tool holder 1 shown in FIG. 1 is not hindered by protruding parts.

Figure 7:
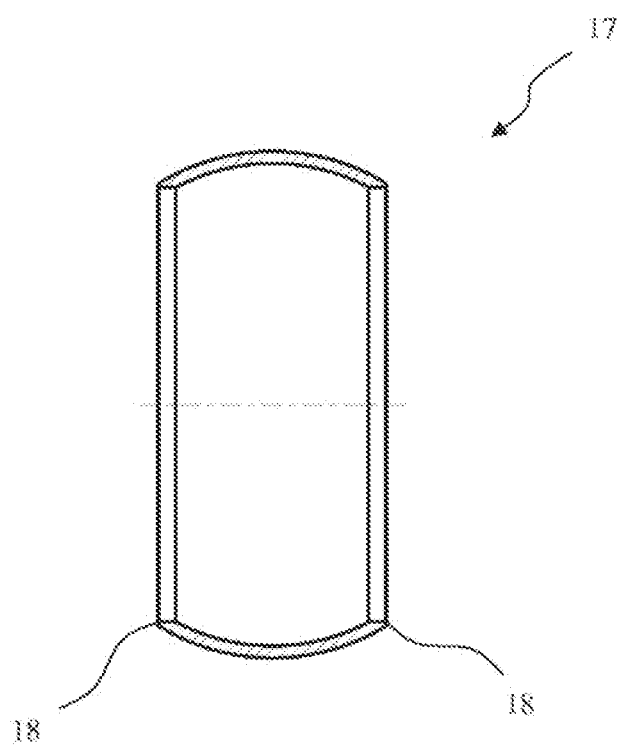
FIG. 7, a longitudinal section through another embodiment of the centering device in accordance with the invention.

In another embodiment of the centering device in accordance with the invention, it is also possible to provide a centering ring 17 in accordance with the invention, shown in FIG. 7. The centering ring 17 has, in cross section, a convex wall, wherein the ends 18 of the centering ring 17 protrude radially inward and form the internal centering areas. The largest diameter and thus, the external centering area of the centering ring 17 is disposed between the ends 18 of the bulbously designed centering ring 18. In a manner analogous to the preceding embodiments of the centering ring, the centering ring 17 is dimensioned in such a manner that the inner diameter of the ends 18 is slightly smaller than the outer diameter of the mandrel 4 shown in FIG. 1, and the outer diameter of the bulbously external centering area has a dimensional excess in comparison to the holder socket 5 of the rotary tool 2.

During an installation of the centering ring 17, instead of the centering ring 6, between the rotary tool 2 and the mandrel 4 of the tool holder 1 shown in FIG. 1, the centering ring 17 is squeezed and the ends are elastically deformed radially outward, and the bulbous external centering area is elastically deformed radially inward. Due to this clamping by means of the centering ring 17, the rotary tool 2 is clamped and centered relative to the mandrel 4.

The centering ring 17 can, moreover, have non-depicted slits in the longitudinal direction. These slits make it possible to change the elasticity of the centering ring 17 and thus to adapt the centering ring 17 to the various changes with regard to the centering effect, the installation force, and the like. In accordance with the invention, the centering ring 17, however, can also be designed concave.

The surrounding collar 16, shown in FIG. 6, with regard to the centering ring, can also be located on the other depicted embodiments of the centering ring, and there likewise fulfills the function of a positioning of the centering ring relative to the rotary tool or relative to the tool holder.

The invention claimed is:

1. A centering device for centric chucking of a milling cutter with a holder socket on a cylindrical mandrel of a tool holder, wherein the milling cutter is slidable over an entire length of the mandrel and is fastened on the tool holder by a locking screw, wherein the centering device is a closed centering ring insertable between the milling cutter and the mandrel, having an elastically deformable contour and a dimensional excess relative to the milling cutter such that the centering ring is elastically deformed inward, wherein the centering ring has at least one elastically movable external centering area, which is deformed radially inward under pressure from the outside when the milling cutter is slid over the mandrel, and wherein the centering ring is a cylindrical tube and the external centering area is formed by a ring-shaped bead that is curved radially outward, wherein the centering ring has, on one end, a ring-shaped collar for placement on the milling cutter and wherein the holder socket has a bevel corresponding to the collar of the centering ring.

2. The centering device according to claim 1, wherein the centering ring has a wall thickness that is substantially constant.

3. A tool arrangement comprising:

a tool holder with a mandrel;

a milling cutter that is placed on the tool holder with a holder socket, the milling cutter being slid over an entire length of the mandrel and fastened on the tool holder by a locking screw; and a centering device inserted between the mandrel and the milling cutter, the centering device being a closed centering ring with an elastically deformable contour, wherein the centering ring has a dimensional excess relative to the milling cutter and is thus elastically deformed inward, the centering ring has at least one elastically movable external centering area, which is deformed radially inward under pressure from the outside when the milling cutter is slid over the mandrel, and the centering ring is a cylindrical tube and the external centering area is formed by a ring-shaped bead that is curved radially outward, wherein the centering ring has, on one end, a ring-shaped collar for placement on the milling cutter and wherein the holder socket has a bevel corresponding to the collar of the centering ring.

4. The tool arrangement according to claim 3, wherein the centering ring has a wall thickness that is substantially constant.

* * * * *